(12) United States Patent
Rajagopal et al.

(10) Patent No.: US 10,148,447 B1
(45) Date of Patent: Dec. 4, 2018

(54) PROVISION OF POWER OVER A DATA INTERFACE USING A SEPARATE RETURN PATH

(71) Applicant: Apple Inc., Cupertino, CA (US)

(72) Inventors: Abhilash Rajagopal, San Jose, CA (US); Kevin White, Los Gatos, CA (US); Leland W. Lew, Los Altos, CA (US); Paul A. Baker, Los Altos, CA (US)

( * ) Notice: Subject to any disclaimer, the term of this patent is extended or adjusted under 35 U.S.C. 154(b) by 226 days.

(21) Appl. No.: 15/264,194

(22) Filed: Sep. 13, 2016

Related U.S. Application Data (60) Provisional application No. 62/234,536, filed on Sep. 29, 2015.

(51) Int. Cl.
*H04L 12/10* (2006.01)
*B60R 16/03* (2006.01)

(52) U.S. Cl.
CPC .............. *H04L 12/10* (2013.01); *B60R 16/03* (2013.01)

(58) Field of Classification Search
CPC ...................................................... H04L 12/10
See application file for complete search history.

(56) References Cited

U.S. PATENT DOCUMENTS

| | | | | |
|---|---|---|---|---|
| 4,733,389 A | * | 3/1988 | Puvogel | H04L 12/40045 370/200 |
| 5,994,998 A | * | 11/1999 | Fisher | H04B 3/542 340/12.3 |
| 6,640,308 B1 | * | 10/2003 | Keyghobad | G05B 19/042 370/254 |
| 2007/0077819 A1 | * | 4/2007 | Thomson | H04L 12/10 439/620.01 |
| 2008/0024939 A1 | * | 1/2008 | Cooper | H04L 12/10 361/1 |
| 2009/0079558 A1 | * | 3/2009 | Diab | H02J 13/0062 340/538 |
| 2013/0229054 A1 | * | 9/2013 | Doring | H04L 12/10 307/10.1 |
| 2013/0262884 A1 | * | 10/2013 | Yu | H04L 12/10 713/300 |
| 2014/0139014 A1 | * | 5/2014 | Sontag | H04L 12/10 307/1 |
| 2016/0187951 A1 | * | 6/2016 | Buckmeier | G06F 1/266 713/300 |
| 2016/0211825 A1 | * | 7/2016 | Standish | H02J 1/00 |
| 2016/0288743 A1 | * | 10/2016 | Bieger | B60R 16/03 |
| 2016/0308683 A1 | * | 10/2016 | Pischl | H04L 12/10 |

* cited by examiner

*Primary Examiner* — Rexford Barnie
*Assistant Examiner* — David Shiao
(74) *Attorney, Agent, or Firm* — Polsinelli PC (57) ABSTRACT

Aspects of the present disclosure involve a circuit for delivering electrical power from a direct current voltage source to an electronic system. The circuit may include a power injection circuit that injects a first portion of the power from a supply voltage of the source to a first data line and a second portion of the power from the supply voltage to a second data line. The power injection circuit may include first and second conductive paths from the supply voltage to the first and second data lines having first and second inductances, respectively, as well as a third conductive path between the first and second data lines having a third inductance greater than the first and second inductances. A conductive support structure may carry return current from the electronic system to the source.

15 Claims, 7 Drawing Sheets

PROVISION OF POWER OVER A DATA INTERFACE USING A SEPARATE RETURN PATH

CROSS REFERENCE TO RELATED APPLICATIONS

This application is related to and claims priority under 35 U.S.C. § 119(e) from U.S. Patent Application No. 62/234,536, filed Sep. 29, 2015, titled "PROVISION OF POWER OVER A DATA INTERFACE USING A SEPARATE RETURN PATH," the entire contents of each are incorporated herein by reference for all purposes.

TECHNICAL FIELD

This disclosure relates generally to electrical power distribution, and more specifically to providing power using a data interface and a separate return path.

BACKGROUND

Wired data interfaces or networks, such as Ethernet and others, each provide a standardized hardware construct by which digital information may be passed between two discrete devices, including, but not limited to, computers, printers, and other electronic devices that intercommunicate. As some devices employing such interfaces have become physically smaller while still consuming a significant amount of power, some developers have employed one or more interface conductors, such as dedicated power and ground (return) lines or unused data lines, to carry power to these devices to avoid the need for an additional power supply incorporated within, or located near, each of the devices.

SUMMARY

One implementation of the present disclosure may take the form of a circuit for delivering electrical power from a direct current (DC) voltage source to an electronic system. The circuit may include power injection circuit configured to inject a first portion of the electrical power from a supply voltage of the DC voltage source to a first data line and to inject a second portion of the electrical power from the supply voltage to a second data line. The power injection circuit may include a first conductive path from the supply voltage to the first data line, the first conductive path having a first inductance, a second conductive path from the supply voltage to the second data line, the second conductive path having a second inductance, and a third conductive path between the first data line and the second data line, the third conductive path having a third inductance greater than the first inductance and the second inductance. The conductive support structure may be configured to carry, from the electronic system to the DC voltage source, return current corresponding to the electrical power provided to the electronic system.

Another implementation of the present disclosure may take the form of a circuit for delivering electrical power from a direct current (DC) voltage source to an electronic system. The circuit includes a first inductor electrically coupling a supply voltage of the DC voltage source to a first data line such that the first data line carries a first portion of the electrical power to the electronic system and a second inductor electrically coupling the supply voltage to a second data line such that the second data line carries a second portion of the electrical power to the electronic system. In the circuit, the first inductor and the second inductor are magnetically coupled such that a first magnetic flux produced by a first current generated by the supply voltage through the first inductor opposes a second magnetic flux produced by a second current generated by the supply voltage through the second inductor. Further, a return conductive path is configured to carry, from the electronic system to the DC voltage source, return current corresponding to the electrical power provided to the electronic system.

Yet another implementation of the present disclosure may take the form of circuit for receiving electrical power from an electronic system at an electrical load. The circuit may include a power extraction circuit configured to extract a first portion of the electrical power from a first data line and to extract a second portion of the electrical power from a second data line. The power extraction circuit includes a first conductive path from the first data line to the electrical load, the first conductive path having a first inductance, a second conductive path from the second data line to the electrical load, the second conductive path having a second inductance, and a third conductive path between the first data line and the second data line, the third conductive path having a third inductance greater than the first inductance and the second inductance. The circuit may also include a conductive support structure is configured to carry, from the electrical load to the electronic system, return current corresponding to the electrical power received from the electronic system.

DETAILED DESCRIPTION

Aspects of the present disclosure involve circuits and methods for delivering and receiving electrical power over at least two data lines of a data interface. These circuits and methods do not require the use of dedicated power and/or ground or reference lines, and need not employ unused data lines of the interface. The data lines employed to provide power may be single-ended or differential in nature, and may constitute any type of data interface employing two or more data lines. In some embodiments, delivery and reception of electrical power may be accomplished utilizing only two data lines. In particular examples discussed herein, the data interface being utilized for power transmission is a single-channel Ethernet interface that employs only two conductors, namely first and second differential data lines. In these examples, both conductors may be employed to supply power, while a chassis or other conductive support structure may provide the current return path.

In at least some of the embodiments described below, the circuits and methods disclosed herein inject power onto data lines, as well as extract the injected power from those data lines, by way of inductances. These inductances may be configured to reduce inductance between a direct current (DC) power supply and the data lines to improve power transmission efficiency while simultaneously increasing inductance across the two data lines to improve impedance matching at lower data rates for better data transmission performance (e.g., higher overall data transmission frequency range) due to less attenuation of the data signals. These embodiments may employ two data interface lines to reduce the amount of wiring utilized while supplying a significant amount of power or current.

Figure 1:
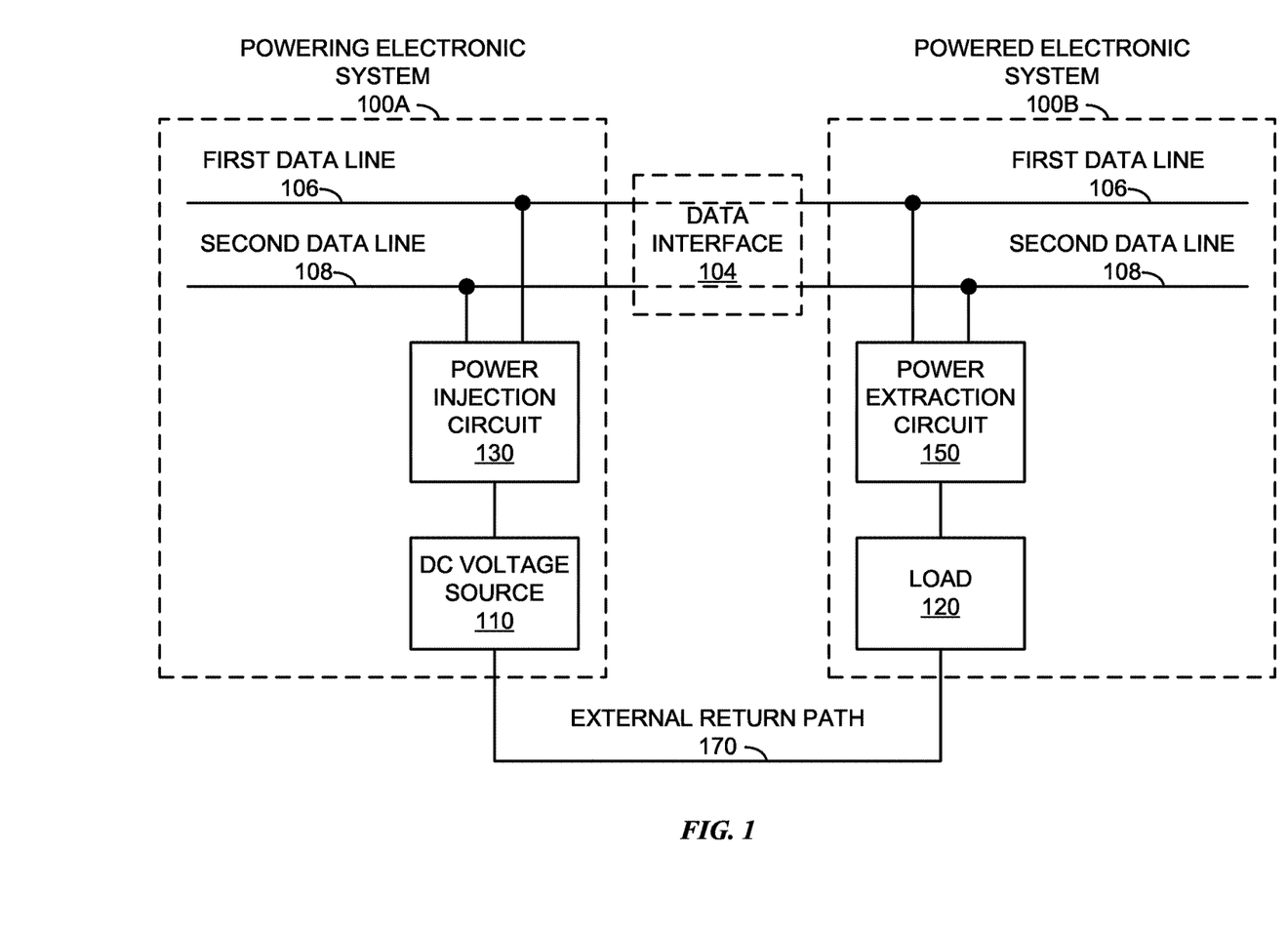
FIG. 1 is a block diagram of example circuits for delivering and receiving power over first and second data lines of a data interface.

FIG. 1 is a block diagram of example circuits for delivering and receiving power over first and second data lines of a data interface. In the example of FIG. 1, a powering electronic system 100A provides power to a powered electronic system 100B by way of a first data line 106 and a second data line 108 of a data interface 104. Generally, the data interface 104 may be any communications pathway that includes at least two data lines (e.g., the first data line 106 and the second data line 108 shown in FIG. 1) connecting two different circuits, devices, or systems. As mentioned above, the first data line 106 and the second data line 108 may be corresponding differential data lines of a single-channel data interface, such as single-channel Ethernet. However, other types of data interfaces that employ two or more data interface lines may be configured and/or operated according to the various circuits and methods described herein. Further, data may be carried over the first data line 106 and the second data line 108 in either or both directions (e.g., from the powering electronic system 100A to the powered electronic system 100B, and/or vice-versa).

The powering electronic system 100A is configured to provide power via the data interface 104, and the powered electronic system 100B is configured to receive that power via the data interface 104. The powering electronic system 100A and the powered electronic system 100B may be any electronic device, unit, or system capable of connecting to the data interface 104. Further, each of the powering electronic system 100A and the powered electronic interface 104 may or may not be capable of transmitting and/or receiving data via the data interface 104. Each of the powering electronic system 100A and the powered electronic system 100B may include components that are located within a single housing or enclosure, or components that may be distributed among two or more such housings or enclosures and interconnected electrically. Examples of such electronic systems 100A and 100B may include, but are not limited to, data processing systems, control systems, sensors, actuators, displays, input/output (I/O) devices, and so on. In the particular examples discussed herein, a single powering electronic system 100A provides power to a single powered electronic system 100B. However, in some embodiments, one or more powering electronic systems 100A may provide power to multiple powered electronic systems 100B by way of a discrete pair of data lines to each of the powered electronic systems 100B, or by way of a single pair of data lines shared by the powering electronic systems 100A and the powered electronic systems 100B.

As illustrated in FIG. 1, the powering electronic system 100A may include a DC voltage source 110 that is configured to inject power onto both the first data line 106 and the second data line 108 by way of a power injection circuit 130, examples of which are described below in conjunction with FIGS. 2 and 3. In a particular example, the DC voltage source 110 may provide a DC supply voltage of 48 VDC (volts DC). However, many other DC voltage levels higher and lower than 48 VDC may be utilized in other embodiments.

Also in FIG. 1, the powered electronic system 100B may include a power extraction circuit 150 that extracts DC electrical power being provided over the data interface 104 via the first data line 106 and the second data line 108 and directs that power to an electrical load 120 of the powered electronic system 100B. In at least some examples, the electrical load 120 may be any electrical or electronic circuitry, including digital and/or analog circuitry, employed by the powered electronic system 100B to perform one or more functions with which the powered electronic system 100B is tasked. Such functions may or may not include the transmission, reception, encoding, decoding, encrypting, decrypting, and/or processing of the data carried over the first data line 106 and the second data line 108. Such functions also may or may not include functions not involved in or related to the transmission and/or reception of data. For example, the powered electronic system 100B may use the data interface 104 strictly to receive and utilize power from the powering electronic system 100A, and not for any data-specific functions, such as the transmission or reception of data via the data interface 104.

While the powering electronic system 100A employs both the first data line 106 and the second data line 108 for transmitting or providing power to the powered electronic system 100B, additional data lines or other conductors specifically associated with the data interface 104 may not be available to provide a return path for the power being consumed by the load 120. In such examples, such as the one specifically depicted in FIG. 1, the powered electronic system 100B employs an external return path 170 that does not constitute part of the data interface 104 to couple the load 120 with a ground reference of the DC voltage source 110 or return side of the DC voltage source 110. In some embodiments, the powering electronic system 100A and the powered electronic system 100B may be mounted on the same chassis or other conductive support structure. In one particular example, the conductive support structure may be a vehicle chassis, such as a chassis of a passenger car, truck, sport utility vehicle, commercial or industrial vehicle, motorcycle, motor scooter, or the like. Other examples include a boat frame or hull, and a plane fuselage. In other implementations, any kind of conductive return path, including those that may or may not be specifically associated with the data interface 104 (e.g. any kind of conductive building infrastructure), may be employed as the external return path 170.

While the particular embodiments of FIG. 1, as well as others described herein, involve the use of two data lines of a data interface to deliver power, any number of pairs of data lines may carry power from one electronic system to another in other examples.

Figure 2:
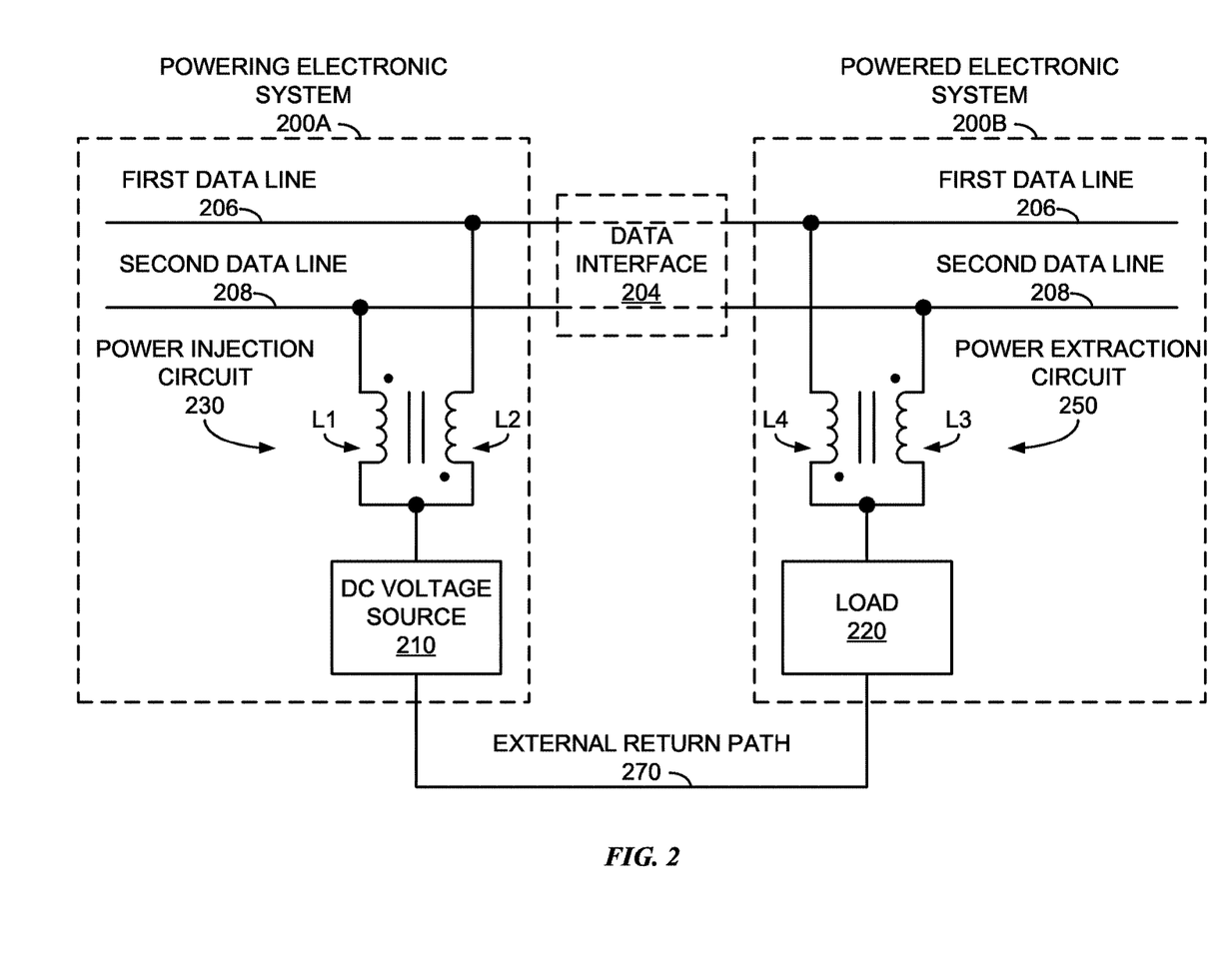
FIG. 2 is a block diagram of additional example circuits for delivering and receiving power over first and second data lines of a data interface.

FIG. 2 is a block diagram of additional example circuits for delivering and receiving power over first and second data lines of a data interface. In the particular example of FIG. 2, a powering electronic system 200A provides power from a DC voltage source 210 over a data interface 204 to an electrical load 220 of a powered electronic system 200B, in a manner similar to that described above in relation to FIG. 1. Also similar to the circuits of FIG. 1, the powering electronic system 200A employs a power injection circuit 230 to inject power from the DC voltage source onto both a first data line 206 and a second data line 208 of the data interface 204, while the powered electronic system 200B extracts that power from the first data line 206 and the second data line 208 using a power extraction circuit 250.

In the embodiment of FIG. 2, the power injection circuit 230 of the powering electronic system 200A includes a first inductor L1 and a second inductor L2. Correspondingly, the power extraction circuit 250 of the powered electronic system 200B includes a third inductor L3 and a fourth inductor L4. In other examples, the power injection circuit 230 and/or the power extraction circuit 250 may include additional components or devices to supplement or augment the operation of the inductors L1-L4.

In FIG. 2, a DC supply voltage of the DC voltage source 210 facilitates an electrical current on a first conductive path through the first inductor L1 onto the second data line 208. Similarly, the supply voltage of the DC voltage source 210 causes an electrical current on a second conductive path through the second inductor L2 onto the first data line 206 that parallels the first conductive path. Additionally, as illustrated in FIG. 2, the first inductor L1 and the second inductor L2 are magnetically coupled such that a first magnetic flux produced by the current in the first conductive path that is caused by the DC voltage source 210 opposes a second magnetic flux produced by the current in the second conductive path that is caused by the DC voltage source 210. Accordingly, from the viewpoint of the DC voltage source 210, the inductances of the first inductor L1 and the second inductor L2 tend to cancel, thus resulting in the first and second conductive paths being low inductance or impedance paths, thus facilitating a more efficient transfer of power over the data interface 204 to the powered electronic system 200B via the first data line 206 and the second data line 208. In one particular example in which the inductance of the first inductor L1 equals the inductance of the second inductor L2, the two inductances cancel from the viewpoint of the DC voltage source 210, possibly resulting in an extremely low (e.g., near-zero) inductance along both the first conductive path and the second conductive path. In at least some embodiments, the first inductor L1 and the second inductor L2 are wound around a common core to magnetically couple the inductors L1 and L2, thus reducing the space or footprint occupied by the inductors L1 and L2 as opposed to employing separate cores for the inductors L1 and L2.

At the same time, the first inductor L1 and the second inductor L2 appear in series as a third conductive path connecting the first data line 206 and the second data line 208 at the powering electronic system 200A. Consequently, in the third conductive path, the magnetic coupling of the first inductor L1 and the second conductor L2 creates an augmentation of the inductances of that path, thus potentially providing better impedance matching, which may be especially important at lower frequencies or data rates for the data signals carried over the first data line 206 and the second data line 208. As a result, from the perspective of the first data line 206 and the second data line 208 at the powering electronic system 200A, the inductance along the third conductive path may be a sum of the inductance of the first inductor L1, the inductance of the second inductor L2, and the mutual inductance of the first inductor L1 and the second inductor L2. In the specific example of the inductances of the first inductor L1 and the second inductor L2 being equal, the total inductance along the third conductive path may be approximately four times the inductance of the first inductor L1 or the second inductor L2, depending upon the actual values of the first inductor L1 and the second inductor L2, in addition to other characteristics of the power injection circuit 230.

At the powered electronic system 200B, the third inductor L3 and the fourth inductor L4 may be configured in a manner similar to the first inductor L1 and the second inductor L2, respectively. Consequently, within the powered electronic system 200B, the DC voltage impressed onto the first data line 206 and the second data line 208 by the DC voltage source 210 at the powering electronic system 200A results in a first current in a first conductive path from the first data line 206 through the fourth inductor L4 to the load 220 and a second current in a second conductive path from the second data line 208 through the third inductor L3 to the load 220. In addition, the third inductor L3 and the fourth inductor L4 are magnetically coupled such that a first magnetic flux produced by the current in the first conductive path that is caused by the DC voltage source 210 opposes a second magnetic flux produced by the current in the second conductive path that is caused by the DC voltage source 210. Accordingly, from the viewpoint of the load 220, the inductances of the third inductor L3 and the fourth inductor L3 tend to cancel, resulting in the first and second conductive paths being low inductance or impedance paths, thereby facilitating a more efficient transfer of power to the load 220 via the first data line 206 and the second data line 208. In one example in which the inductance of the third inductor L3 equals the inductance of the fourth inductor L4, the two inductances cancel from the viewpoint of the load 220, possibly resulting in an extremely low inductance along both the first conductive path and the second conductive path of the powered electronic system 200B.

Simultaneously, the third inductor L3 and the fourth inductor L4 appear in series as a third conductive path between the first data line 206 and the second data line 208 at the powered electronic system 200B. Therefore, in the third conductive path, the magnetic coupling of the third inductor L3 and the fourth conductor L4 creates an enhancement of the inductances of that path, thus possibly providing more effective impedance matching, especially at lower data signaling rates on the first data line 206 and the second data line 208. As a result, from the perspective of the first data line 206 and the second data line 208 at the powered electronic system 200B, the inductance along the third conductive path may be a sum of the inductance of the third inductor L3, the inductance of the fourth inductor L4, and the mutual inductance of the third inductor L3 and the fourth inductor L4. In a particular example of the inductances of the third inductor L3 and the fourth inductor L4 being equal, the total inductance along the third conductive path may be approximately four times the inductance of the third inductor L3 or the fourth inductor L4, depending upon the actual values of the third inductor L3 and the fourth inductor L4, as well as other characteristics of the power extraction circuit 250.

Figure 3:
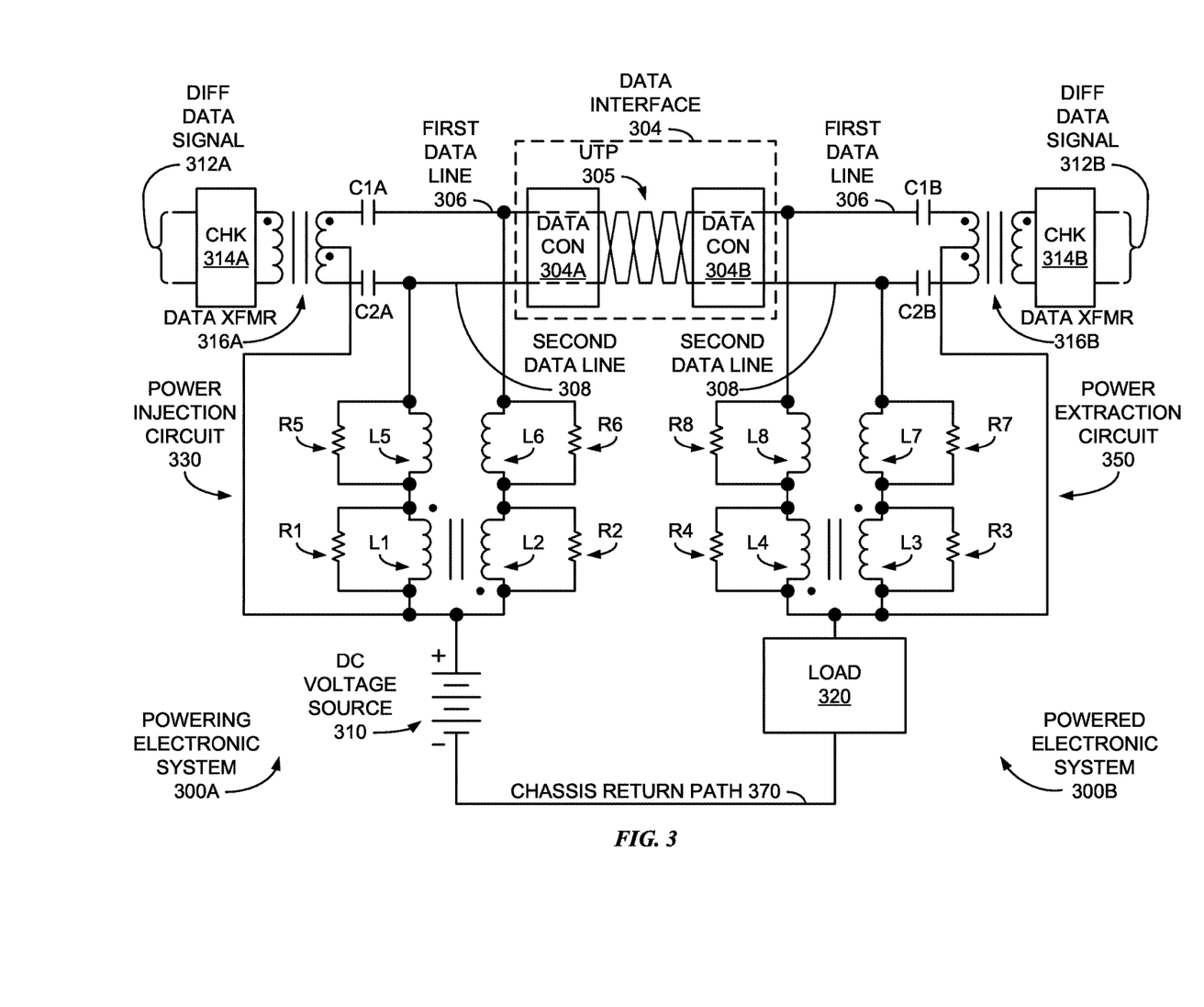
FIG. 3 is a block diagram of further example circuits for delivering and receiving power over first and second data lines of a data interface.

FIG. 3 is a block diagram of further example circuits for delivering and receiving power over first and second data lines of a data interface. More specifically, FIG. 3 depicts a powering electronic system 300A configured to supply electrical power to a powered electronic system 300B by way of a data interface 304 that includes a first data connector 304A of the powered electronic system 300A and a second data connector 304B of the powered electronic system 300B that are interconnected by way of a single unshielded twisted pair (UTP) cable 305, as what may be found in a single-channel Ethernet interface. Typically, a UTP cable is employed to cancel out noise currents induced into the twisted conductor pair by magnetic radiation from an external source. In other examples, other types of data interfaces, including those that employ shielded twisted pair (STP) cable, untwisted cable, and so on, may be employed in the data interface 304.

Regarding the transmission of data, the powering electronic system 300A transmits and/or receives data signals as differential data signals 312A. When transmitting, the differential data signals 312A may be passed via a common mode choke 314A to a data transformer 316A. The choke 314A is configured to pass differential signals without significant attenuation, and to heavily attenuate common mode noise, thus blocking noise from being passed to the data transformer 316A. In turn, the data transformer 316A is configured to provide galvanic isolation between the powering electronic system 300A and the data interface 304, as well as to provide some common mode rejection and to help protect the powering electronic system 300A against circuit faults on the data interface 304. In some examples, the position of the choke 314A and the data transformer 316A may be reversed, such that a transmitted differential data signal 312A is passed through the data transformer 316A prior to the choke 314A before proceeding to the data connector 304A. In other embodiments, two chokes 314A and two data transformers 316A may be employed in the powering electronic system 300A, one each for transmitting data and one each for receiving data over the first data line 306 and the second data line 308.

In the example of FIG. 3, the powering electronic system 300A may also include a first capacitor C1A coupling an outer tap of the data transformer 316A to the first data line 306 and a second capacitor C2A coupling the other outer tap of the data transformer 316A to the second data line 308. The capacitors C1A and C2A may be utilized to provide DC isolation between the differential data signal 312A and the DC power being supplied by a DC voltage source 310 by way of a power injection circuit 330. In one example, the capacitors C1A and C2A may each have a value of 0.01 microfarads (µF), but other values for the capacitors C1A and C2A may be utilized in other embodiments. In yet other examples, the capacitors C1A and C2A may not be employed in the powering electronic system 300A.

Similarly, the powered electronic system 300B provides and/or receives differential data signals 312B via one or more of a common mode choke 314B, a data transformer 316B, and capacitors C1B and C2B, which may be configured and operated in a manner similar to the choke 314A, the data transformer 316A, and the capacitors C1A and C2A of the powering electronic system 300A, as described above.

The DC voltage source 310 of the powering electronic system 300A may be a voltage source that powers both the powering electronic system 300A and the powered electronic system 300B, or may be a source separate and distinct from another voltage source (not shown in FIG. 3) powering the powering electronic system 300A. In one example, the DC voltage source 310 may be a 48 VDC voltage source; however, higher or lower output voltages for the DC voltage source 310 may be employed in other examples, depending at least in part on the particular power needs of the powered electronic system 300B. In yet other embodiments, the output voltage level of the DC voltage source 310 may be controlled, and thus varied over time, by a power management system. For example, the power management system may lower the output voltage level during periods of little or no communication, or during periods of lower data rates, between the powering electronic system 300A and the powered electronic system 300B.

In the specific example of FIG. 3, the positive (output) terminal of the DC voltage source 310 is connected to a center output tap of the data transformer 316A. This connection biases the outer taps of the data transformer 316A to the output voltage of the DC voltage source 310, thereby matching the DC components of the signals being output from the data transformer 316A, and thus the attached ends of the first capacitor C1A and the second capacitor C2A, with the DC component of the signals on the first data line 306 and the second data line 308 at the data connector 304A, therefore maintaining approximately zero VDC across the capacitors C1A and C2A, depending on the windings, core, and other characteristics of the data transformer 316A. Connecting the center tap to the DC voltage source 310 in such a manner may be particularly beneficial if the capacitors C1A and C2A are ceramic capacitors, whose capacitance may vary significantly with increasing DC voltage imposed across the capacitors C1A and C2A. In other examples, the center output tap of the data transformer 316A may be tied to another voltage, such as ground, or may be left floating. Likewise, the center output tap of the data transformer 316B of the powered electronic system 300B may be coupled to the electrical load 320, or may be connected to another voltage reference or left floating in a manner matching that of the powering electronic system 300A.

As depicted in the FIG. 3, the power injection circuit 330 of the powering electronic system 300A may include several components, including inductors L1, L2, L5, and L6, as well as resistors R1, R2, R5, and R6. For example, a first inductor L1 and a second inductor L2 may be magnetically coupled in a manner similar to that of the first inductor L1 and the second inductor L2 described above in conjunction with FIG. 2. As a result, the inductances of inductors L1 and L2 may tend to negate one another from the viewpoint of the DC voltage source 310 through the first inductor L1 and the second inductor L2 to the first data line 306 and the second data line 308, thus providing relatively low inductance paths through the inductors L1 and L2. Oppositely, along the path from the first data line 306 through inductors L1 and L2 to the second data line 308, the differential data signal 312A would encounter the sum of the inductances of the first inductor L1 and the second inductor L2, in addition to the mutual inductance of the first inductor L1 and the second inductor L2, resulting in enhanced impedance matching, especially at lower data rate ranges. In at least some examples, the inductances of the first inductor L1 and the second inductor L2 are equal, resulting in a near-zero inductance from the viewpoint of the DC voltage source 310. Further, the powered electronic system 300B may include a third inductor L3 and a fourth inductor L4 that operate in a manner similar to that of the third inductor L3 and the fourth inductor L4 of FIG. 2 by providing lesser inductance values for the paths from the first data line 306 and the second data line 3089 to the electrical load 320 than for the path between the first data line 306 and the second data line 308 across which the differential data signal 312B is applied.

In the embodiment of FIG. 3, an additional pair of inductors (a fifth inductor L5 and a sixth inductor L6) may be included in the power injection circuit 330, with the fifth inductor L5 placed in series with the first inductor L1, and the sixth inductor L6 positioned in series with the second inductor L2. In at least some examples, the additional inductors L5 and L6 may provide an impedance corresponding to a different frequency band of the differential data signal 312A compared to that associated with the first inductor L1 and the second inductor L2. For example, the inductance values of the first inductor L1 and the second inductor L2 may be set such that they provide a selected or desired impedance for the differential data signal 312A over a first frequency range, while the inductance values of the fifth inductor L5 and the sixth inductor L6 may be set so that they provide a selected impedance for the differential data signal 312A over a second frequency range. In one particular example, the inductance value of each of the first inductor L1 and the second inductor L2 is selected to be 22 microhenries (pH), while the inductance value of each of the fifth inductor L5 and the sixth inductor L6 may be selected to be 1 μH. In some embodiments, these particular values result in the first inductor L1 and the second inductor L2 providing a desired impedance for impedance matching purposes over a frequency range of 10 megahertz (MHz) to 40 MHz, or possibly 1 MHz to 40 MHz, while the fifth inductor L5 and the sixth inductor L6 provide a selected impedance over a higher frequency range of 40 MHz and above.

As depicted in FIG. 3, while the first inductor L1 and the second inductor L2 are magnetically coupled (e.g., wound around a single core), the fifth inductor L5 and the sixth inductor L6 are not magnetically coupled. In at least some examples, such as the particular embodiment described above, magnetically coupling the fifth inductor L5 and the sixth inductor L6 would not be exceptionally desirable since the size of the fifth inductor L5 and the sixth inductor L6 (1 pH) is much smaller than the size of the first inductor L1 and the second inductor L2 (22 pH), thus not adding an appreciable amount of inductance to the conductive paths from the DC voltage source 310 to the first data line 306 and the second data line 308. Moreover, using a common core for the fifth inductor L5 and the sixth inductor L6 may increase parasitic capacitance between the coupled inductors L5 and L6, especially for the higher frequency range associated with these inductors L5 and L6. Such interwinding capacitance may be, for example, 5 picofarads (pF), which may be significant at higher data transfer frequencies. However, in some examples, the fifth inductor L5 and the sixth inductor L6 may be magnetically coupled in a manner similar to that of the first inductor L1 and the second inductor L2. In some examples, more than the two sets of inductors (L1, L2, L5, and L6) may be employed in other embodiments in order to address a higher number of frequency ranges.

In the specific example illustrated in FIG. 3, each inductor L1, L2, L5, and L6 of the power injection circuit 330 is connected in parallel with a corresponding resistor R1, R2, R5, and R6, respectively. In at least some embodiments, each of the resistors R1, R2, R5, and R6 is employed to dampen resonance in its associated inductor L1, L2, L5, and L6, especially near the mid-band of the frequencies associated with the differential data signal 312A (e.g., the frequencies between the first frequency band associated with the first inductor L1 and the second inductor L2, and the second frequency band associated with the fifth inductor L5 and the sixth inductor L6). In at least some scenarios, such resonance may be caused by the inductors L1, L2, L5, and L6 and their associated parasitic capacitances. In this case, presuming a mid-band frequency of 40 MHz using the particular inductance values for the inductors L1, L2, L5, and L6 indicated above, each of the first resistor R1 and the second resistor R2 may be selected to have a resistance of 8 kilohms (kΩ), while the fifth resistor R5 and the sixth resistor R6 each may have a resistance of 400 ohms (Ω).

While particular frequency ranges, inductance values, and capacitances values are specified above in conjunction with the embodiment of FIG. 3, other values for these same characteristics may be utilized in other embodiments.

As with the embodiment of FIG. 2, inductors L3, L4, L7, and L8, and resistors R3, R4, R7, and R8 of the powered electronic system 300B may be employed in a corresponding manner to the inductors L1, L2, L5, and L6, and resistors R1, R2, R5, and R6, respectively, of the powering electronic system 300A. Moreover, the particular component values of each of the inductors L3, L4, L7, and L8, and resistors R3, R4, R7, and R8 may match the value of its counterpart component (inductors L1, L2, L5, and L6, and resistors R1, R2, R5, and R6) in at least some embodiments, although the values of the various components need not be so constrained in other examples.

In the case of the data interface 304 being a two-conductor, single-channel Ethernet or similar interface, the maximum DC current of a single conductor (e.g., the first data line 306 or the second data line 308) may be, for example, 2.5 amperes (A). Accordingly, the powering electronic system 300A, by employing both the first data line 306 and the second data line 308, may provide a total of 5 A of DC current to power the powered electronic system 300B, given that a chassis return path 370 external to the data interface 304 is provided. Further, the total amount of power provided by the powering electronic system 300 may depend on the output voltage level of the DC voltage source 310. For example, a voltage level of 48 VDC, at a maximum DC current provided of 5 A, may result in a maximum power of 240 watts (W) deliverable to the powered electronic system 300B.

FIGS. 4 through 7 provide flow diagrams of various methods of delivering power to, or receiving power from, an electronic system via a data interface. In each example, references are made to the particular circuits of FIG. 2 to facilitate understanding of the methods. However, other circuits (e.g., the circuits of FIG. 3) that perform these same or similar methods may be employed in other embodiments. Also, while each of the methods of FIGS. 4 through 7 indicate that each operation therein is performed in a particular order of execution, the operations may be performed simultaneously or concurrently over some continuous period of time, as is described above in relation to the circuit embodiments of FIGS. 1 through 3.

Figure 4:
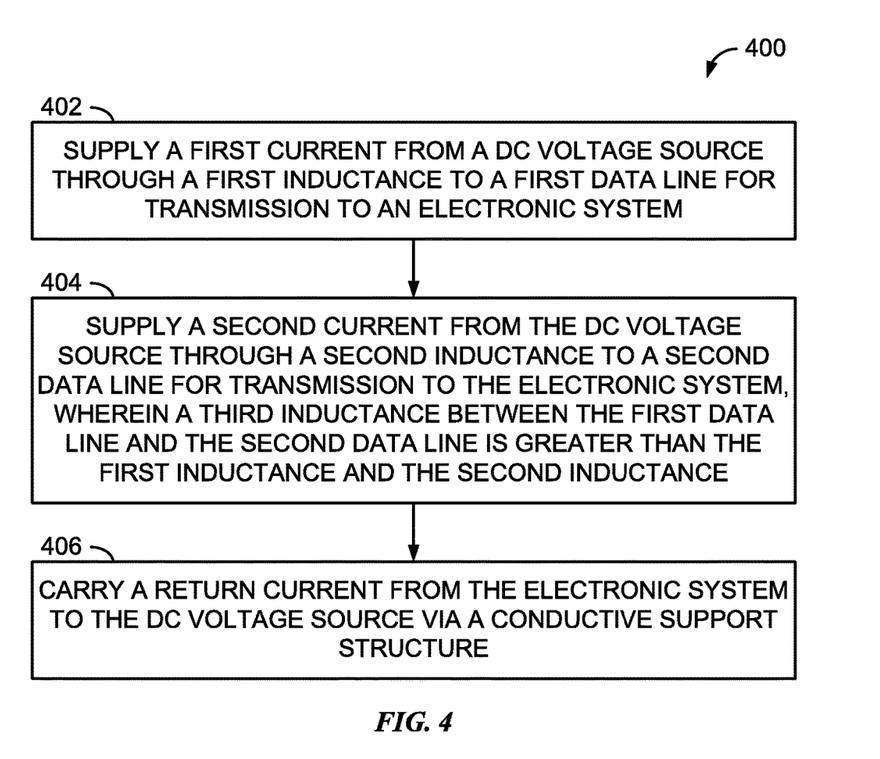
FIG. 4 is a flow diagram of an example method of delivering power over first and second data lines of a data interface to an electronic system.

FIG. 4 is a flow diagram of an example method 400 of delivering power over first and second data lines (e.g., the first data line 206 and the second data line 208) of a data interface (e.g., data interface 204) to an electronic system (e.g., the powered electronic system 200B). In the method 400, a first current from a DC voltage source (e.g., the DC voltage source 210) may be supplied through a first inductance (e.g., the first inductor L1) to the first data line for transmission to the electronic system (operation 402). Also, a second current may be supplied from the DC voltage source through a second inductance (e.g., the second inductor L2) to the second data line for transmission to the electronic system (operation 404). Accordingly, a third inductance (e.g., a series combination of the first inductor L1 and the second inductor L2) between the first data line and the second data line may be greater than the first inductance and the second inductance. In addition, a return current may be carried from the electronic system to the DC voltage source via a conductive support structure (e.g., the external return path 270) (operation 406).

Figure 5:
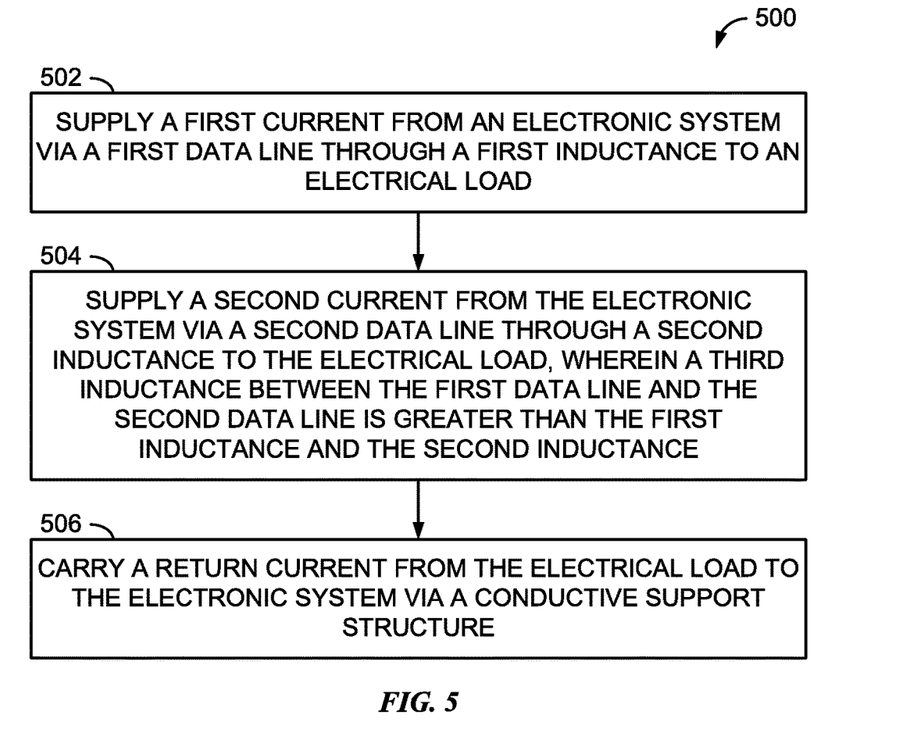
FIG. 5 is a flow diagram of an example method of extracting power from first and second data lines of a data interface.

FIG. 5 is a flow diagram of an example method 500 of extracting power from first and second data lines (e.g., the first data line 206 and the second data line 208) of a data interface (e.g., the data interface 204), wherein the power is provided by an electronic system (e.g., the powering electronic system 200A). In the method 500, a first current may be supplied from the electronic system via the first data line through a first inductance (e.g., the fourth inductor L4) to an electrical load (e.g., the electrical load 220) (operation 502). A second current may be supplied from the electronic system via the second data line through a second inductance (e.g., the third inductor L3) to the electrical load (operation 504). Consequently, a third inductance (e.g., a series combination of the third inductor L3 and the fourth inductor L4) between the first data line and the second data line may be greater than the first inductance and the second inductance. A return current may then be carried from the electrical load to the electronic system via a conductive support structure (e.g., the external return path 270) (operation 506).

Figure 6:
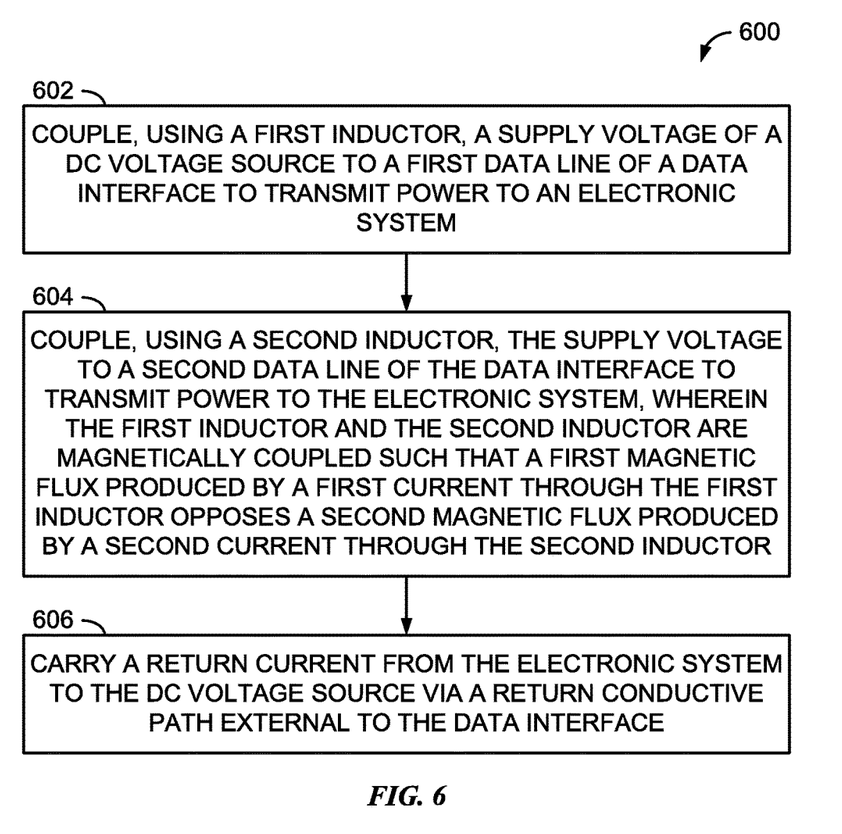
FIG. 6 is a flow diagram of another example method of delivering power over first and second data lines of a data interface to an electronic system.

FIG. 6 is a flow diagram of another example method 600 of delivering power over first and second data lines (e.g., the first data line 206 and the second data line 208) of a data interface (e.g., the data interface 204) to an electronic system (e.g., the powered electronic system 200B). In the method 600, a first inductor (e.g., the second inductor L2) may be used to couple a supply voltage of a DC voltage source (e.g., the DC voltage source 210) to the first data line of the data interface to transmit power to the electronic system (operation 602). A second inductor (e.g., the first inductor L1) may be used to couple the supply voltage to the second data line of the data interface to transmit power to the electronic system (operation 604). In addition, the first inductor and the second inductor may be magnetically coupled such that a first magnetic flux produced by a first current through the first inductor opposes a second magnetic flux produced by a second current through the second inductor. A return current may be carried from the electronic system to the DC voltage source via a return conductive path external to the data interface (e.g., the external return path 270) (operation 606).

Figure 7:
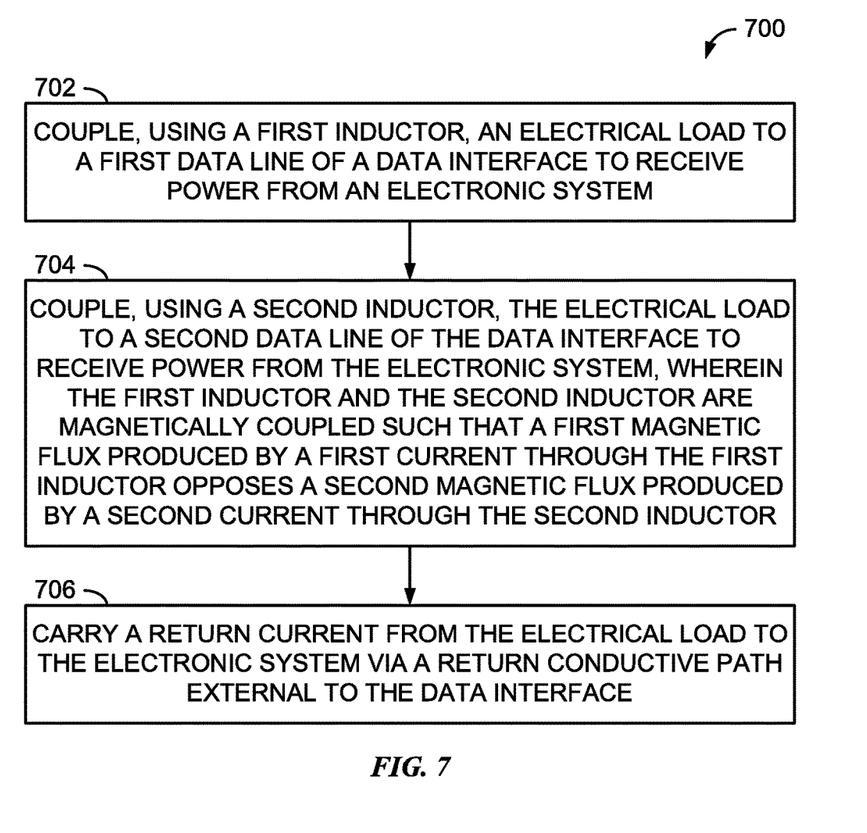
FIG. 7 is a flow diagram of another example method of extracting power from first and second data lines of a data interface.

FIG. 7 is a flow diagram of another example method 700 of extracting power from first and second data lines (e.g., the first data line 206 and the second data line 208) of a data interface (e.g., the data interface 204), wherein the power is provided by an electronic system (e.g., the powering electronic system 200A). In the method 700, a first inductor (e.g., the fourth inductor L4) may be used to couple an electrical load (e.g., the electrical load 220) to the first data line of the data interface to receive power from the electronic system (operation 702). Also, a second inductor (e.g., the third inductor L3) may be used to couple the electrical load to the second data line of the data interface to receive power from the electronic system (operation 704). In addition, the first inductor and the second inductor may be magnetically coupled such that a first magnetic flux produced by a first current through the first inductor opposes a second magnetic flux produced by a second current through the second inductor. A return current may be carried from the electrical load to the electronic system via a return conductive path external to the data interface (e.g., the external return path 270) (operation 706).

While the present disclosure has been described with reference to various implementations, it will be understood that these implementations are illustrative and that the scope of the disclosure is not so limited. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A circuit for delivering electrical power from a direct current (DC) voltage source to an electronic system, the circuit comprising:
   a power injection circuit configured to inject a first portion of the electrical power from a supply voltage of the DC voltage source to a first data line and to inject a second portion of the electrical power from the supply voltage to a second data line, the power injection circuit comprising:
      a first inductor electrically coupling the supply voltage of the DC voltage source to the first data line such that the first inductor carries the first portion of the electrical power to the first data line;
      a second inductor electrically coupling the supply voltage of the DC voltage source to the second data line such that the second inductor carries the second portion of the electrical power to the second data line;
      wherein the first and second inductors are magnetically coupled such that a first magnetic flux produced by a first current generated by the supply voltage through the first inductor opposes a second magnetic flux produced by a second current generated by the supply voltage through the second inductor; and
      wherein the first and second inductors are each connected in parallel with a corresponding resistor, each resistor configured to dampen resonance associated with a corresponding inductor;
   a choke for receiving a first and second data signal component, the choke configured to pass the first and second data signals and to attenuate common mode noise;
   an isolation transformer connected to the choke, the isolation transformer configured to provide galvanic isolation; and
      wherein a first outer tap of the isolation transformer is coupled to a first capacitor, the first capacitor connected to the first data line;
      wherein a second outer tap of the isolation transformer is coupled to a second capacitor, the second capacitor connected to the second data line; and
      wherein a center tap of the isolation transformer is coupled to the supply voltage of the DC power source;
   a return path external to the power injection circuit, the choke, and the isolation transformer, the return path configured to carry from the electronic system to the DC voltage source, return current corresponding to the electrical power provided to the electronic system.

2. The circuit of claim 1, wherein the first and second data lines comprise first and second differential data signal lines configured to carry a differential data signal for a data interface.

3. The circuit of claim 2, wherein the data interface comprises a single-channel Ethernet interface.

4. The circuit of claim 1, wherein the return path comprises a vehicle chassis.

5. The circuit of claim 1, further comprising:
   a third inductor coupled in series with the first inductor between the supply voltage and the first data line;

a fourth inductor coupled in series with the second inductor between the supply voltage and the second data line;

wherein the first and second inductors are configured to provide a first impedance for a first frequency range of data signals carried over the first and second data lines; and wherein the third and fourth inductors are configured to provide a second impedance for a second frequency range of the data signals carried over the first and second data lines.

6. The circuit of claim 5, wherein the third inductor and the fourth inductor are not magnetically coupled.

7. The circuit of claim 5, wherein the second frequency range is higher than the first frequency range.

8. A circuit for delivering electrical power from a direct current (DC) voltage source to an electronic system, the circuit comprising:

a first inductor electrically coupling a supply voltage of the DC voltage source to a first data line such that the first data line carries a first portion of the electrical power to the electronic system;

a second inductor electrically coupling the supply voltage of the DC voltage source to a second data line such that the second data line carries a second portion of the electrical power to the electronic system;

wherein the first inductor and the second inductor are magnetically coupled such that a first magnetic flux produced by a first current generated by the supply voltage through the first inductor opposes a second magnetic flux produced by a second current generated by the supply voltage through the second inductor; and wherein the first inductor and the second inductor are each connected in parallel with a corresponding resistor, each resistor configured to dampen resonance associated with a corresponding inductor;

a choke for receiving a first and second data signal component, the choke configured to pass the first and second data signals and to attenuate common mode noise;

an isolation transformer connected to the choke, the isolation transformer configured to provide galvanic isolation; and wherein a first outer tap of the isolation transformer is coupled to a first capacitor, the first capacitor connected to the first data line;

wherein a second outer tap of the isolation transformer is coupled to a second capacitor, the second capacitor connected to the second data line; and wherein a center tap of the isolation transformer is coupled to the supply voltage of the DC power source;

a return conductive path external to the first inductor, the second inductor, the choke, and the isolation transformer, the return conductive path configured to carry from the electronic system to the DC voltage source, return current corresponding to the electrical power provided to the electronic system.

9. The circuit of claim 8, wherein the first and second data lines comprise first and second differential data signal lines configured to carry a differential data signal for a data interface.

10. The circuit of claim 8, wherein the return conductive path comprises a vehicle chassis.

11. The circuit of claim 8, further comprising:

a third inductor coupled in series with the first inductor between the supply voltage and the first data line;

a fourth inductor coupled in series with the second inductor between the supply voltage and the second data line;

wherein the first and second inductors are configured to provide a first impedance corresponding to a first frequency range of data signals carried over the first and second data lines; and wherein the third and fourth inductors are configured to provide a second impedance corresponding to a second frequency range of the data signals carried over the first and second data lines.

12. The circuit of claim 11, wherein the third inductor and the fourth inductor are not magnetically coupled.

13. The circuit of claim 11, wherein the second frequency range is higher than the first frequency range.

14. A circuit for receiving electrical power from an electronic system at an electrical load, the circuit comprising:

a power extraction circuit configured to extract a first portion of the electrical power from a first data line and to extract a second portion of the electrical power from a second data line, the power extraction circuit comprising:

a first inductor electrically coupling the electrical load to the first data line such that the electrical load receives the first portion of the electrical power from the first data line; and a second inductor electrically coupling the electrical load to the second data line such that the electrical load receives the second portion of the electrical power from the second data line;

wherein the first inductor and the second inductor are magnetically coupled such that a first magnetic flux produced by a first current received from the first data line through the first inductor opposes a second magnetic flux produced by a second current received from the second data line through the second inductor; and wherein the first inductor and the second inductor are each connected in parallel with a corresponding resistor, each resistor configured to dampen resonance associated with a corresponding inductor;

a choke for receiving a first and second data signal component, the choke configured to pass the first and second data signals and to attenuate common mode noise;

an isolation transformer connected to the choke, the isolation transformer configured to provide galvanic isolation; and wherein a first outer tap of the isolation transformer is coupled to a first capacitor, the first capacitor connected to the first data line;

wherein a second outer tap of the isolation transformer is coupled to a second capacitor, the second capacitor connected to the second data line; and wherein a center tap of the isolation transformer is coupled to the electrical load;

a return path external to the power extraction circuit, the choke, and the isolation transformer configured to carry from the electrical load to the electronic system, return current corresponding to the electrical power received from the electronic system.

15. A circuit for receiving electrical power from an electronic system at an electrical load, the circuit comprising:

a first inductor electrically coupling the electrical load to a first data line such that the electrical load receives a first portion of the electrical power from the first data line;

a second inductor electrically coupling the electrical load to a second data line such that the electrical load receives a second portion of the electrical power from the second data line;

wherein the first inductor and the second inductor are magnetically coupled such that a first magnetic flux produced by a first current received from the first data line through the first inductor opposes a second magnetic flux produced by a second current received from the second data line through the second inductor; and wherein the first inductor and the second inductor are each connected in parallel with a corresponding resistor, each resistor configured to dampen resonance associated with a corresponding inductor;

a choke for receiving a first and second data signal component, the choke configured to pass the first and second data signals and to attenuate common mode noise;

an isolation transformer connected to the choke, the isolation transformer configured to provide galvanic isolation; and wherein a first outer tap of the isolation transformer is coupled to a first capacitor, the first capacitor connected to the first data line;

wherein a second outer tap of the isolation transformer is coupled to a second capacitor, the second capacitor connected to the second data line; and wherein a center tap of the isolation transformer is coupled to the electrical load;

a return conductive path external to the first inductor, the second inductor, the choke, and the isolation transformer, the return conductive path configured to carry from the electrical load to the electronic system, return current corresponding to the electrical power received from the electronic system.

* * * * *